(12) United States Patent
Kidd et al.

(10) Patent No.: US 8,185,922 B1
(45) Date of Patent: May 22, 2012

(54) METHOD AND APPARATUS OF VERIFYING THAT REQUESTED CONTENT MATCHES CONTENT TO BE DOWNLOADED

(75) Inventors: Deanna R. Kidd, Long Beach, CA (US); Mitch C. Jacobs, Rancho Palos Verdes, CA (US); Aspandyar M. Jijina, Lomita, CA (US); Sui-Ky R. Ling, Rancho Palos Verdes, CA (US); Michael R. Munsell, Playa Del Rey, CA (US); Xavier D. Riley, Los Angeles, CA (US); Jeffrey L. Sharkey, Hermosa Beach, CA (US); Haydee C. Silva, Garden Grove, CA (US); Ranny Q. Sue, Laguna Niguel, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 843 days.

(21) Appl. No.: 12/079,579

(22) Filed: Mar. 27, 2008

(51) Int. Cl.
*H04N 7/16* (2011.01)
*H04N 7/173* (2011.01)

(52) U.S. Cl. .............. 725/28; 725/25; 725/93; 725/100; 725/116; 725/134

(58) Field of Classification Search .............. 725/87, 725/91, 93, 98, 100, 25, 28, 105, 114, 115, 725/116, 131, 134
See application file for complete search history.

(56) References Cited

U.S. PATENT DOCUMENTS

| | | | |
|---|---|---|---|
| 4,230,990 A | 10/1980 | Lert et al. | |
| 4,866,719 A | 9/1989 | Morgan et al. | |
| 4,967,273 A | 10/1990 | Greenberg | |
| 5,200,822 A | 4/1993 | Bronfin et al. | |
| 5,450,122 A | 9/1995 | Keene | |
| 5,649,283 A | 7/1997 | Galler et al. | |
| 5,937,331 A | 8/1999 | Kalluri et al. | |
| 6,243,145 B1 | 6/2001 | Schlarb et al. | |
| 6,397,039 B1 | 5/2002 | Butte et al. | |

(Continued)

FOREIGN PATENT DOCUMENTS

| EP | 1100268 A2 | 5/2001 |
|---|---|---|
| EP | 1244309 A1 | 9/2002 |

OTHER PUBLICATIONS

Non-final Office Action dated Apr. 30, 2009 in U.S. Appl. No. 11/728,552, filed Mar. 26, 2007 by Daniel M. Miner.

(Continued)

*Primary Examiner* — Kristine Kincaid
*Assistant Examiner* — John Schnurr

(57) ABSTRACT

A system and method for distributing requested content includes a content management system 12 and a device 14 such as a set top box that selects a selection corresponding to content in the content management system 12 and transmits a first material identification to the content management system. The content management system 12 transmits the content to the device with a second material identification associated therewith. The device 14 receives the content and the second material identification and compares the first material identification to the second material identification. When the second material identification corresponds to the content, the device continues downloading the content. When the second material identification does not correspond to the content, downloading of the file is discontinued. A content prefix may also be used alone or in combination with the material identification. The content is prevented from being transmitted if the content prefix does not correspond to the content type.

27 Claims, 4 Drawing Sheets

U.S. PATENT DOCUMENTS

| | | | |
|---|---|---|---|
| 6,604,224 B1* | 8/2003 | Armstrong et al. | 714/819 |
| 7,712,123 B2 | 5/2010 | Miyaoku et al. | |
| 2002/0054068 A1 | 5/2002 | Ellis et al. | |
| 2002/0174438 A1 | 11/2002 | Cleary et al. | |
| 2003/0005457 A1* | 1/2003 | Faibish et al. | 725/94 |
| 2003/0028890 A1 | 2/2003 | Swart et al. | |
| 2003/0051252 A1 | 3/2003 | Miyaoku et al. | |
| 2004/0244036 A1 | 12/2004 | Wright | |
| 2004/0255325 A1* | 12/2004 | Furui et al. | 725/61 |
| 2005/0010944 A1 | 1/2005 | Wright et al. | |
| 2005/0015816 A1 | 1/2005 | Christofalo et al. | |
| 2005/0060754 A1 | 3/2005 | Simyon | |
| 2006/0195886 A1* | 8/2006 | Ashley | 725/138 |
| 2007/0040934 A1 | 2/2007 | Ramaswamy et al. | |
| 2007/0124789 A1 | 5/2007 | Sachson et al. | |
| 2008/0115171 A1 | 5/2008 | Barsness et al. | |
| 2008/0172693 A1 | 7/2008 | Ludvig | |
| 2008/0232782 A1* | 9/2008 | Kanemaru et al. | 386/124 |

OTHER PUBLICATIONS

Isnardi, Michael; "ATSC Program and System Information Protocol (PSIP)"; Sarnoff Corporation; Oct. 18, 2000; pp. 9-12.

Non-final Office action dated Jun. 14, 2010 in U.S. Appl. No. 11/728,552, filed Mar. 26, 2007 by Daniel M. Miner.

Final Rejection dated Oct. 15, 2009 in U.S. Appl. No. 11/728,552, filed Mar. 26, 2007 by Daniel M. Miner.

Notice of Allowance dated Dec. 15, 2010 in U.S. Appl. No. 11/728,552, filed Mar. 26, 2007 by Daniel M. Miner.

* cited by examiner

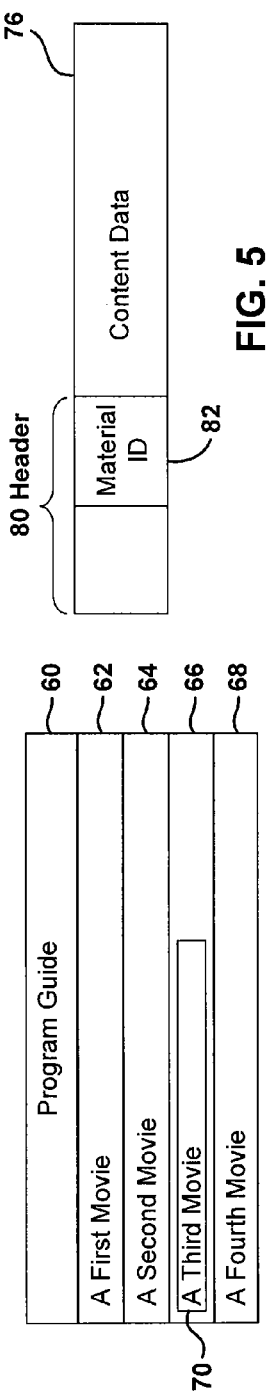
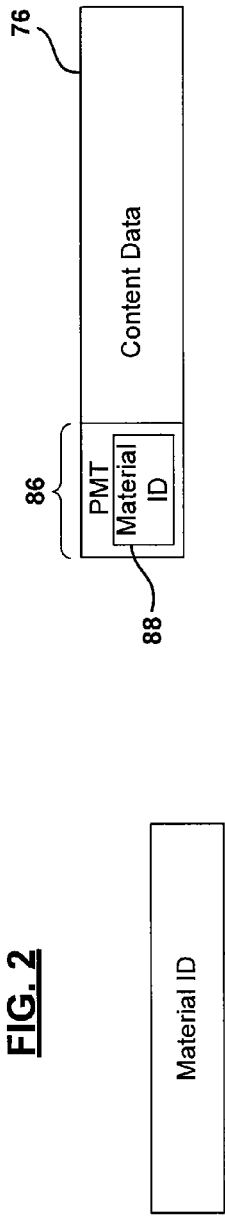
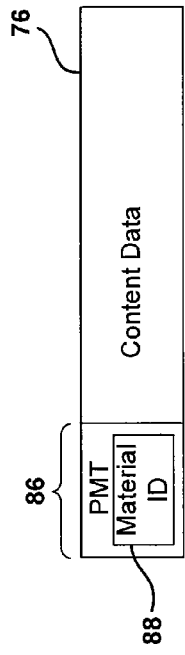
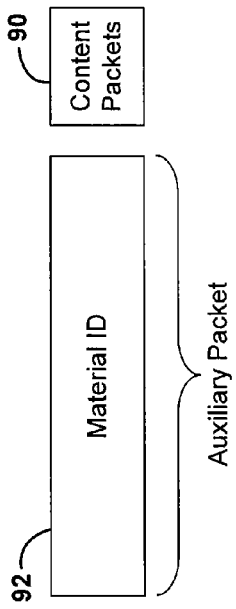
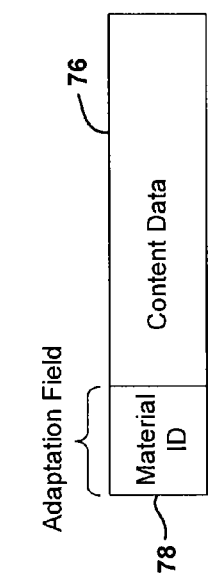
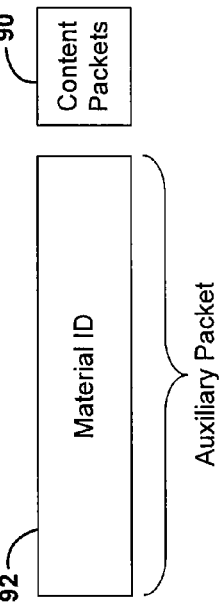

METHOD AND APPARATUS OF VERIFYING THAT REQUESTED CONTENT MATCHES CONTENT TO BE DOWNLOADED

TECHNICAL FIELD

The present disclosure relates to downloading content to a device and, more specifically, to a method and apparatus for verifying that requested content matches the content to be downloaded.

BACKGROUND

The statements in this section merely provide background information related to the present disclosure and may not constitute prior art.

Satellite television is increasingly popular. Providing various types of content to users on-demand is desirable. When delivering content, a content distribution system obtains various content and transmits the content to a user device such as a set top box. Various computers, routers and such are used in the process. Because of the various processes involved, content may be misrouted and, therefore, the wrong content file may be provided to the user.

SUMMARY

The present disclosure provides a method and system to verify the content being downloaded is the requested content.

In one aspect of the disclosure, a method for verifying content comprises selecting a selection corresponding to content in the content management system from a device, transmitting a first material identification to the content management system, transmitting the content to the device when the content prefix corresponds to the content type with a second material identification associated therewith. The method further includes preventing transmission of the content to the device when the content prefix does not match the content type device with the second material identification associated therewith. The method further includes receiving the content and the second material identification at the device, comparing the first material identification and the second material identification. When the second material identification corresponds to the first material identification, continuing download of the content. When the first material identification does not correspond to the content, discontinuing download of the file.

In another aspect of the disclosure, a method of operating a content distribution system includes receiving content from a content provider, assigning a second material identification and a content type prefix to the content, communicating the content type prefix to a transport processing system having a content type, transmitting the content when the content prefix corresponds to the content type, and preventing transmission of the content when the content prefix does not correspond to the content type.

In another aspect of the disclosure, a system for distributing requested content includes a content management system and a device such as a set top box that selects a selection corresponding to content in the content management system and transmits a first material identification to the content management system. The content management system transmits the content to the device with a second material identification associated therewith. The device receives the content and the second material identification and compares the first material identification to the second material identification. When the second material identification corresponds to the content, the device continues downloading the content. When the second material identification does not correspond to the content, downloading of the file is discontinued.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2 is a layout view of a program guide according to the present disclosure.

FIG. 3 is a representative view of a material ID for transmission to a content processing system.

FIG. 4 is a first embodiment of a representation of a communication according to the present disclosure.

FIG. 5 is a second embodiment of a communication according to the present disclosure.

FIG. 6 is a third embodiment of a communication according to the present disclosure.

FIG. 7 is a fourth embodiment of a communication according to the present disclosure.

DETAILED DESCRIPTION

Figure 1:
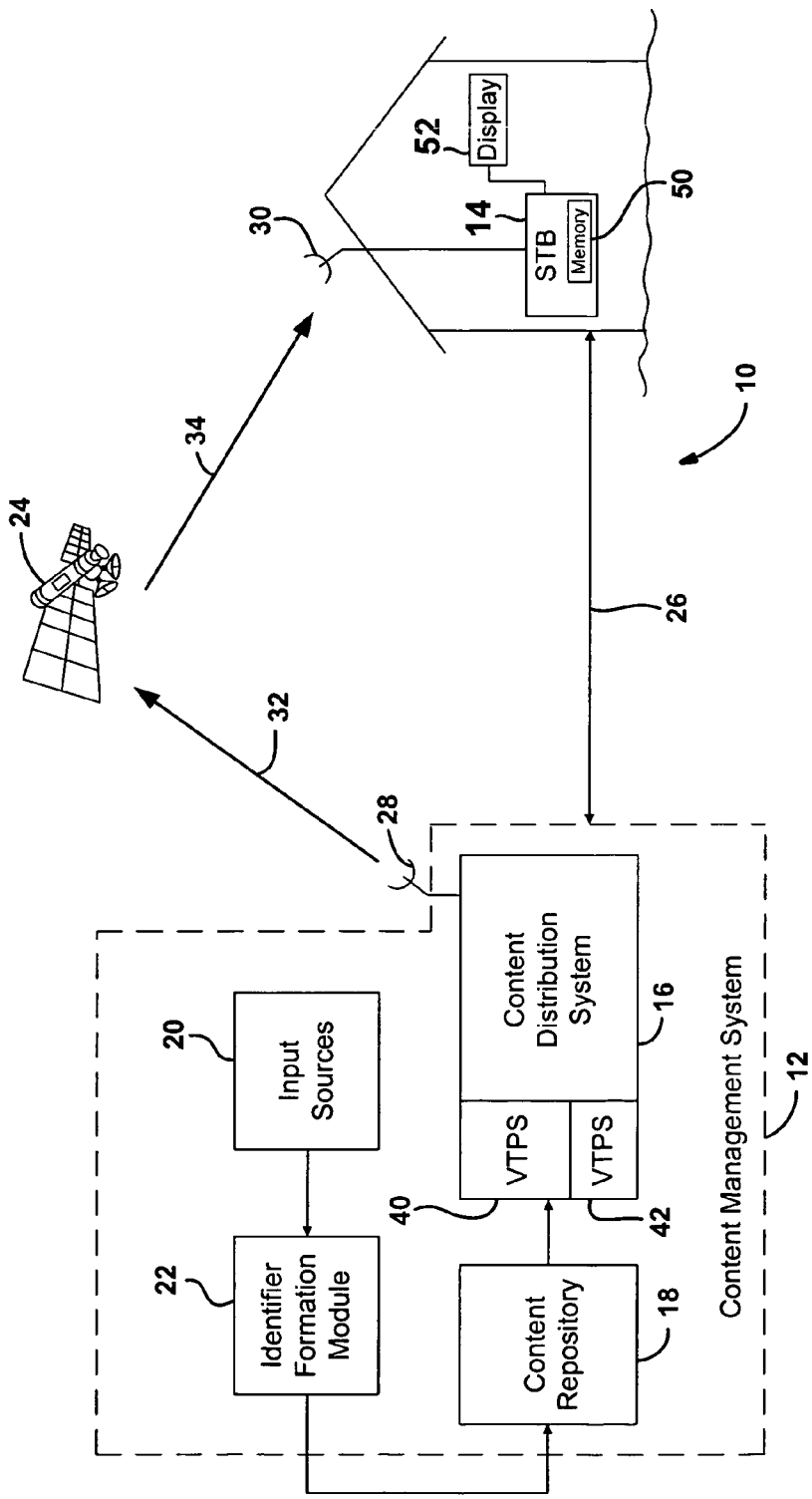
FIG. 1 is a system level view of a verification system according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The following system is described with respect to a satellite system and a broadband distribution system. The broadband distribution system may be implemented in a broadband Internet service such as a cable or DSL system. An optical fiber may also be used as the broadband system.

Referring now to FIG. 1, a communication system 10 having a content management system 12 in communication with a device such as a set top box 14. The content management system 12 includes a content distribution system 16 that receives content from a content repository 18. The content management system 18 also includes input sources 20 and an identifier formation module 22. Input sources 20 receive information from, but is not limited to, tapes, DVDs, a satellite receiver, telephone lines, and optical fibers. The content from the input sources may be in various formats.

The identifier formation module 22 associates a material identification with the received content. The material identification may include a title, a numerical identification, or combinations thereof. The material identification may also include the source from which it was received, formatting, and other identifying information. The identifier formation module 22 may also assign a prefix to the content. The content prefix may identify the content type such as a full version, a preview version, an adult title, or the like. The prefix is not unique to one particular piece of content. Rather, the prefix identifies a group of content types.

The content, the material identification and the prefix may be stored in a content repository 18. A content repository 18 may store the received content in various formats. The content repository 18 may be formed of memory devices such as hard drives and the like. Preferably banks of drives and associated routing systems may be used.

The content repository 18 communicates with the content distribution system 16. The content distribution system 16 receives a request for content and distributes the content selection through a satellite 24 or a broadband communication line 26. The content distribution system 16 is in communication with satellite 24 through an antenna 28. The device 14 is in communication with the satellite 24 through antenna 30. Uplink signals 32 are generated from antenna 28. Downlink signals 34 are generated at the satellite 24 and are received by the antenna 30. The communication line 26 may include an optical fiber, a copper wire such as a telephone line, or the like. It should be noted that the signals may also be generated using terrestrial communication from antennas 28 and 30. Rather than directing the signals through the satellite 24, the signals may be broadcast wired directly from a content distribution system to the device 14 or through a cellular system using cell towers or the like. WiMax, LAN, and WLAN systems may also be used.

The content distribution system 16 includes a first video transport processing system (VTPS) 40 and a second video transport processing system (VTPS) 42. More than two VTPS's may be used in a system. The two video transport processing systems 40, 42 are used for encrypting and encoding content to be transmitted to the device 14. The video transport processing systems 40, 42 may be independent processing systems used for processing two different content types. One may be used for a specific content type while the other for the remaining content types. For example, video transport processing system 40 may be used for processing non-adult content while video processing system 42 may be used for processing adult content. As will be further described below, based upon the prefix, one or the other system may be used to transmit or to prevent transmission of the content. That is, if expected content is non-adult and an adult content with an adult prefix is presented to the non-adult video transport processing system, the VTPS may not transmit the content.

As mentioned above, device 14 may be a set top box. The device 14 may also include a memory 50 associated therewith. A display 52 may also be associated with the device 14 for displaying the content. A television or monitor may be used as a display 52. The display 52 may also be used for displaying various information such as a program guide.

Referring now to FIG. 2, a program guide 60 is illustrated. The program guide 60 contains various different selections 62, 64, 66, and 68. The selections correspond to content available at the content management system 12. The available content titles and the associated material identifications may be stored in the memory of the device for display using the program guide 60. Selection 62 comprises a first movie, selection 64 comprises a second movie, selection 66 comprises a third movie, and selection 68 comprises a fourth movie. A selection box 70 may be moved by way of a remote control or buttons on the device to make a first selection. It should also be noted that, although four different movies are illustrated, various types of programming events such as sporting events, informational programs, and the like may be program guide selections. As will be described below, upon selection, a first material identification may be transmitted to the content management system 12.

FIG. 3 is a representation of a material identification 72 formed upon a selection from the program guide. The material identification 72 may form a material identification signal. The material identification 72 may take many forms such as alpha-numeric, numeric, and alphabetical. The material identification 72 is unique to the corresponding content.

Referring now to FIG. 4, once the material identification 72 is transmitted to the content management system 12, a signal may be generated that includes content data 76 such as a file or packets of a file and various types of identification, including a material identification from the content management system 12. The prefix may be removed before communication from the VTPS. In FIG. 4, an adaptation field 78 includes the material identification.

Referring now to FIG. 5, in another format, the content data 76 may be transmitted within a header 80. The header 80 may also include the material identification 72.

Referring now to FIG. 6, the content data 76 may be in an MPEG format. The MPEG format may include a program map table (PMT) 86. The program map table (PMT) 86 may include material identification 88. More specifically, the material identification may be part of a descriptor in the PMT 88.

Referring now to FIG. 7, the content may be generated using content packets 90. The content packets 90 may be sent together with a material identification packet 92. The material identification packet 92 may be an auxiliary packet that is transmitted in addition to the content. The auxiliary material identification packet 72 may be the first or one of the first few packets so that the material identification may be provided to the device 14.

Figure 8:
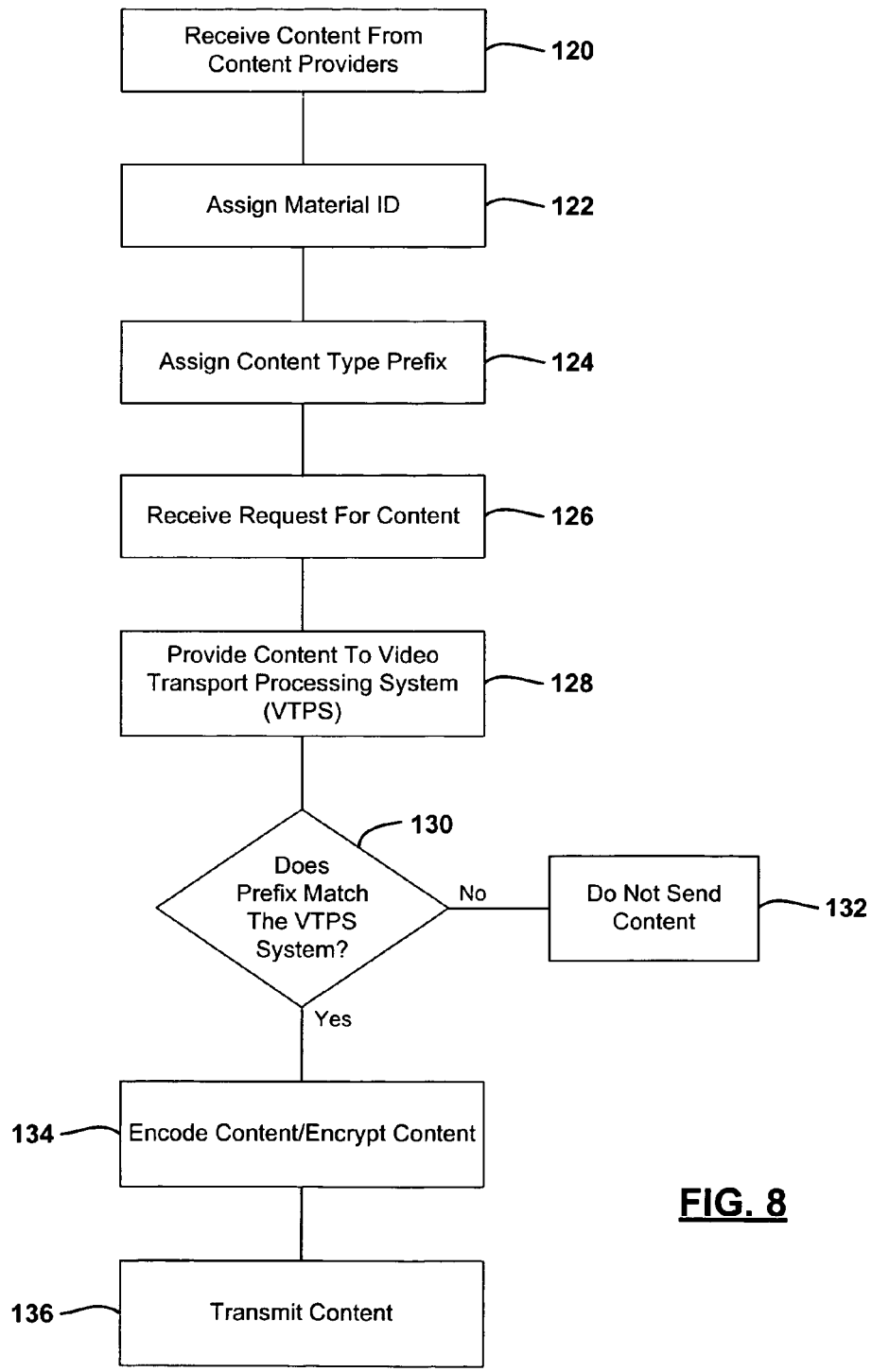
FIG. 8 is a flowchart of a method for transmitting content according to the present disclosure.

Referring now to FIG. 8, a method for operating a content distribution system is illustrated. In step 120, content is received from content providers. As mentioned above, various types of receiving mediums may be used, including over-the-air content, optical fiber, broadband, satellite received content, and the like. The content is received and decoded, if required. A material identification is assigned to the content in step 122. The material identification may, for example, be a number, a title, or a combination of the two. Various other forms of identification, such as the content source, may also be used.

In step 124, a content type prefix may also be assigned to the content. A content-type prefix may be used for identifying a general type of content received. The general type of content may, for example, be adult and non-adult titles. Other examples of content types may include a preview version and a full-paid version. Various numbers of files may include the prefix type that is associated with the content.

In step 126, a request for content is received from the device. The request may be a selection corresponding to the content in the content management system. The request may be in the form of a material identification.

In step 128, the content file is provided to the video transport processing system 40. The content-type prefix and the material identification may also be provided to the video transport processing system.

In step 130, if the prefix does not match the video type transport processing system, step 132 does not send the content.

In step 130, if the prefix matches the video type transport processing system, step 134 encodes and encrypts the content. In step 136, the encrypted and encoded content is transmitted to the device by one of the various methods described above. As mentioned above, the content prefix may not be transmitted.

Figure 9:
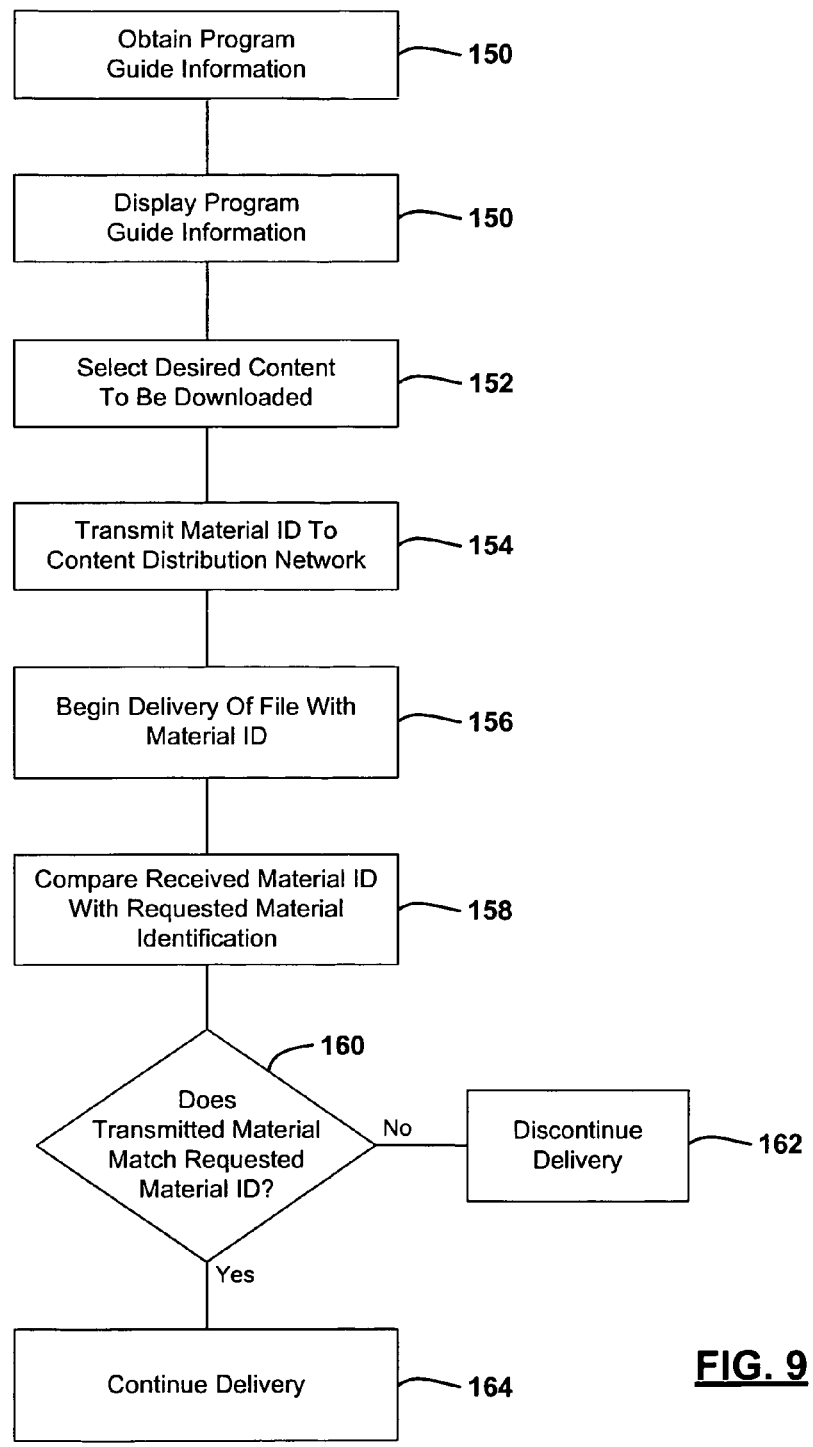
FIG. 9 is a method for obtaining content from the device.

Referring now to FIG. 9, a method of obtaining content at a device includes the step of obtaining program guide information in step 150. The program guide information may be received in the various manners described above, including satellite, wireless, terrestrial wireless, or wired connections. The program guide information may include current programming as well as the content available for downloading. In step 152, the program guide information is displayed on the display associated with the device. When the device is a set top box, the display may be a television.

In step 152, the desired content to be downloaded is selected. As mentioned above, the selection process may be performed using a remote control or other user interface. Buttons on the device may also be used for the selection.

In step 154, the material identification corresponding to the content is transmitted to the content management system from the device. The material identification may be transmitted in various manners described above.

In step 156, the delivery of the file with a material identification is performed. The material identification is a transmitted or second material identification that corresponds to the content. In step 158, the transmitted or second material identification is compared with the requested or first material identification. In step 160, if the transmitted material identification does not match the requested material identification, the delivery of the content may be discontinued in step 162. In step 160, if the transmitted material identification matches the requested material identification, step 164 is performed in which the delivery of the content is continued. The content may be stored in a memory associated with the device such as a digital video recorder (DVR). Many set top boxes include a digital video recorder associated therewith.

As may be evident by reviewing the above, two different types of checks are disclosed for the content: a prefix check and the material identification check A prefix may be assigned so that transmission of content not associated with the prefix is prevented if the prefix and the video transport processing system type do not correspond. Further, a material identification may be compared at the device to prevent the download of content other than that requested by the device. The two different checks may be used separately or may be used together in a system to provide maximum protection against misdirected content.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of receiving content comprising:
   selecting a selection corresponding to content available from a content management system at a user device;
   transmitting a first material identification from the user device to the content management system;
   transmitting content from the content management system to the user device with a second material identification associated therewith, said user device separate from the content management system;
   receiving the content and the second material identification at the user device;
   comparing the first material identification and the second material identification in the user device;
   when the second material identification corresponds to the first material identification, continuing download of the content at the user device; and
   when the second material identification does not correspond to the first material identification, discontinuing download of the content at the user device.

2. A method as recited in claim 1 wherein selecting comprises selecting the content from a program guide.

3. A method as recited in claim 1 further comprising prior to selecting a selection, receiving program guide information.

4. A method as recited in claim 3 wherein receiving program guide information comprises receiving program guide information from a satellite.

5. A method as recited in claim 3 wherein receiving program guide information comprises receiving program guide information from a broadband connection.

6. A method as recited in claim 1 wherein selecting is performed at a set top box.

7. A method as recited in claim 1 wherein transmitting a first material identification comprises transmitting the material identification through a satellite.

8. A method as recited in claim 1 wherein transmitting a first material identification comprises transmitting the material identification through a broadband connection.

9. A method as recited in claim 1 wherein downloading the content comprises storing the content in a memory associated with the user device.

10. A method as recited in claim 1 wherein downloading the content comprises storing the content in a digital video recorder associated with the user device.

11. A method as recited in claim 1 wherein transmitting content from the content management system comprises transmitting the second material identification in an auxiliary packet.

12. A method as recited in claim 1 wherein transmitting content from the content management system comprises transmitting the second material identification in an adaptation field.

13. A method as recited in claim 1 wherein transmitting content from the content management system comprises transmitting the second material identification in a packet header.

14. A method as recited in claim 1 wherein transmitting content from the content management system comprises transmitting the second material identification in a program map table.

15. A method of operating a content distribution system comprising:
   receiving content from a content provider;
   assigning a content type prefix to the content, said content type prefix comprising a content type to which a plurality of content belongs;
   assigning a transport processing system to at least one content type prefix;
   communicating the content and associated content type prefix to the transport processing system;
   transmitting the content using the transport processing system when the content type prefix of the content corresponds to the content type prefix assigned to the transport processing system; and preventing transmission of the content when the content type prefix of the content does not correspond to the content type prefix of the transport processing system.

16. A method as recited in claim 15 wherein transmitting content comprises transmitting content to a user device.

17. A method as recited in claim 16 wherein the device comprises a set top box.

18. A method as recited in claim 15 further comprising storing the content type prefix in association with the content in a content repository.

19. A method as recited in claim 15 wherein the content prefix comprises an adult content prefix.

20. A method as recited in claim 15 wherein transmitting the content comprises transmitting the content without the prefix.

21. A method of distributing content comprising:
receiving content from a content provider;
assigning a content type prefix to the content that comprises a content type to which a plurality of content belongs;
assigning a transport processing system to at least one content type prefix;
communicating the content type prefix to the transport processing;
selecting a selection corresponding to content in a content management system from a device;
transmitting a first material identification to the content management system from a device;
transmitting the content with a second material identification associated therewith to the device using the transport processing system when the content type prefix of the content corresponds to the content type prefix associated with the transport processing system;
preventing transmission of the content to the device when the content type prefix does not correspond to the content type prefix associated with the processing system;
receiving the content and the second material identification at the device;
comparing the first material identification and the second material identification;
when the second material identification corresponds to the content, continuing download of the content; and
when the second material identification does not correspond to the content, discontinuing download of the content.

22. A method as recited in claim 21 wherein prior to transmitting the content, encrypting the content.

23. A method as recited in claim 21 wherein prior to transmitting the content, encoding the content.

24. A system for distributing requested content comprising:
a content management system;
a user device selecting a selection corresponding to content in the content management system and transmitting a first material identification to the content management system;
the content management system transmitting content to the user device with a second material identification associated therewith;
the user device receiving the content and the second material identification and comparing the first material identification and the second material identification, when the second material identification corresponds to the content, the user device continues download of the content, and when the second material identification does not correspond to the content, the user device discontinues download of the content.

25. A system as recited in claim 24 wherein the device comprises a set top box.

26. A system as recited in claim 24 further comprising a broadband connection coupling the device to the content management system.

27. A system as recited in claim 24 further comprising a satellite coupling the device to the content management system.

* * * * *